(12) United States Patent
Shnitser et al.

(10) Patent No.: US 10,014,552 B1
(45) Date of Patent: Jul. 3, 2018

(54) LITHIUM ION RECHARGEABLE BATTERY

(71) Applicant: Physical Optics Corporation, Torrance, CA (US)

(72) Inventors: Paul Shnitser, Irvine, CA (US); Jonathan Ryan Daneman, Torrance, CA (US); Jeffrey Ryan Norell, Los Angeles, CA (US); David Miller, San Pedro, CA (US)

(73) Assignee: Physical Optics Corporation, Torrance, CA (US)

( * ) Notice: Subject to any disclaimer, the term of this patent is extended or adjusted under 35 U.S.C. 154(b) by 85 days.

(21) Appl. No.: 15/144,572

(22) Filed: May 2, 2016

Related U.S. Application Data

(60) Provisional application No. 62/187,588, filed on Jul. 1, 2015.

(51) Int. Cl.
| | | |
|---|---|---|
| *H01M 10/0525* | (2010.01) | |
| *H01M 4/134* | (2010.01) | |
| *H01M 4/62* | (2006.01) | |
| *H01M 4/1395* | (2010.01) | |
| *H01M 2/16* | (2006.01) | |
| *H01M 10/056* | (2010.01) | |
| *H01M 4/02* | (2006.01) | |

(52) U.S. Cl.
CPC ......... *H01M 10/0525* (2013.01); *H01M 2/16* (2013.01); *H01M 4/134* (2013.01); *H01M 4/1395* (2013.01); *H01M 4/628* (2013.01); *H01M 10/056* (2013.01); *H01M 2004/021* (2013.01); *H01M 2004/027* (2013.01)

(58) Field of Classification Search
CPC .. H01M 10/0525; H01M 2/16; H01M 10/056; H01M 4/134; H01M 4/1395; H01M 4/628; H01M 2004/021; H01M 2004/027
See application file for complete search history.

(56) References Cited

U.S. PATENT DOCUMENTS

2009/0305129 A1* 12/2009 Fukui .................... H01M 4/134
429/200

OTHER PUBLICATIONS

Hu et al. "Si nanoparticle-decorated Si nanowire networks for Li-ion battery anodes"; Chem. Commun. 47, pp. 367-369. (Year: 2011).*

* cited by examiner

*Primary Examiner* — Gregg Cantelmo
(74) *Attorney, Agent, or Firm* — Sheppard, Mullin, Richter & Hampton LLP; Daniel Yannuzzi; Mike Kim

(57) ABSTRACT

Embodiments of the disclosed lithium ion rechargeable battery include an anode, a cathode, and a separator including an electrolyte to prevent physical contact between the anode and the cathode, while also providing medium for transporting the lithium ions. In some embodiments, the anode may include a microporous scaffold structure that includes a silicon crystal covered in a thin polycrystalline silicon cover. Additionally, the various embodiments described herein further describe increasing the surface area of the microporous scaffold structure so as to provide a more efficient charge flow between the anode and the cathode. In some embodiment, the two or more microporous scaffold structures are stacked on top of one another so that there is an increase in contact area and reduced contact resistance, thus further increasing the charge capacity of the disclosed lithium ion rechargeable battery.

18 Claims, 5 Drawing Sheets

LITHIUM ION RECHARGEABLE BATTERY

CROSS-REFERENCE TO RELATED APPLICATIONS

This application claims the benefit of and priority to U.S. Provisional Patent Application Ser. No. 62/187,588 filed on Jul. 1, 2015, the contents of which are incorporated herein by its entirety.

TECHNICAL FIELD

The disclosed technology relates generally to rechargeable lithium ion batteries. More specifically, the disclosed technology relates to rechargeable lithium ion batteries for use within portable electronic devices.

BACKGROUND

Approximately 7 million Americans currently use hearing aid devices to help improve their hearing and speech comprehension abilities. While the batteries used to power the hearing aid devices are inexpensive, safe to use, and easy to dispose of, most non-chargeable batteries are only operational for approximately one week before the batteries are completely depleted and need to be replaced with a new set of batteries.

In other instances, hearing aid devices may also utilize rechargeable batteries, such as lithium ion rechargeable batteries by way of example. While lithium ion rechargeable batteries may be an attractive form of a reusable energy storage system due to its high specific energy and energy density, they are not without drawbacks. For example, lithium ion rechargeable batteries develop increased internal resistance over time, which decreases the rechargeable battery's ability to hold and deliver current to the portable electronic devices. This results in the need to more frequently recharge the lithium ion rechargeable batteries, which not only creates great inconvenience to the device user, but may even potentially create life threatening situations when the rechargeable batteries are used to power portable medical devices. This is especially true since senior members often constitute the largest group of members who regularly use portable medical devices on a daily basis, where the portable medical devices may even be often used to treat and manage potentially life threatening medical conditions.

As such, increasing the amount of energy or charge that can be packed into a given volume of rechargeable batteries is one of the major challenges in improving the advantages of lithium ion rechargeable batteries over other competing energy storage types. By doing so, the need to constantly or frequently recharge the lithium ion rechargeable battery is effectively eliminated, which then results in increased efficiency, battery life, and dependability.

However, it should be noted that the problems associated with non-chargeable batteries and rechargeable batteries are not strictly limited to hearings aids or other medical advices, but rather, also applies to all battery powered devices in general.

BRIEF DESCRIPTION OF THE EMBODIMENTS

In view of the above drawbacks, there exists a long felt need for a lithium ion rechargeable battery that is not only able to withstand multiple charge and discharge cycles without materially reducing its charge and energy capacities, but also able to provide greater and efficient charge flow and capacity, so that frequent recharging is not required.

Disclosed herein are various embodiments of a rechargeable battery that may include an anode, a cathode, and a separator including an electrolyte to prevent physical contact between the anode and the cathode. Additionally, the separator may also act as a medium for transporting ions, such as lithium ions by way of example only. In some embodiments, the anode may include a microporous scaffold structure that is made of silicon crystal and further covered in a thin polycrystalline silicon layer. In further embodiments, the anode may also include of two or more microporous scaffold structures that are stacked on top of one another, such that there is an increase in contact area between the microporous scaffold structures to reduce contact resistance in the anode.

Other various embodiments include a method of producing a rechargeable battery comprising an anode, a cathode, and a permeable barrier comprising an electrolyte in between the anode and the cathode. In some embodiments, the anode includes a microporous scaffold structure made of a silicon crystal covered with a thin polycrystalline silicon layer. The method may also include forming hollow periodic channels in the microporous scaffold structures of the anode. In further embodiments, the method may also include stacking at least a top microporous scaffold structure over a bottom microporous structure and rotating the top microporous structure with respect to the bottom microporous structure, so as to provide increased contact area between the stacked anode structures to reduce contact resistance in the anode.

BRIEF DESCRIPTION OF THE DRAWINGS

Various embodiments are disclosed herein and described in detail with reference to the following figures. The drawings are provided for purposes of illustration only and merely depict typical or example embodiments of the disclosed technology. These drawings are provided to facilitate the reader's understanding of the disclosed technology and shall not be considered limiting of the breadth, scope, or applicability thereof. It should be noted that for clarity and ease of illustration these drawings are not necessarily made to scale.

The figures are not intended to be exhaustive or to limit the invention to the precise form disclosed. It should be understood that the invention can be practiced with modification and alteration, and that the disclosed technology be limited only by the claims and the equivalents thereof.

DETAILED DESCRIPTION OF THE EMBODIMENTS

The following description is not to be taken in a limiting sense, but is made for the purpose of describing the disclosed embodiments. Numerous specific details are set forth to provide a full understanding of various aspects of the subject disclosure. It will be apparent, however, to one ordinarily skilled in the art that various aspects of the subject disclosure may be practiced without some of these specific details. In other instances, well-known structures and techniques have not been shown in detail to avoid unnecessarily obscuring the subject disclosure.

Embodiments of the rechargeable lithium ion battery described herein are provided for a variety of different applications, and some embodiments relate to a lithium ion rechargeable battery for portable electronic devices, such as hearing aid devices byway of example only. In some embodiments, the lithium ion rechargeable battery includes an cathode, anode, and a separator.

Figure 1:
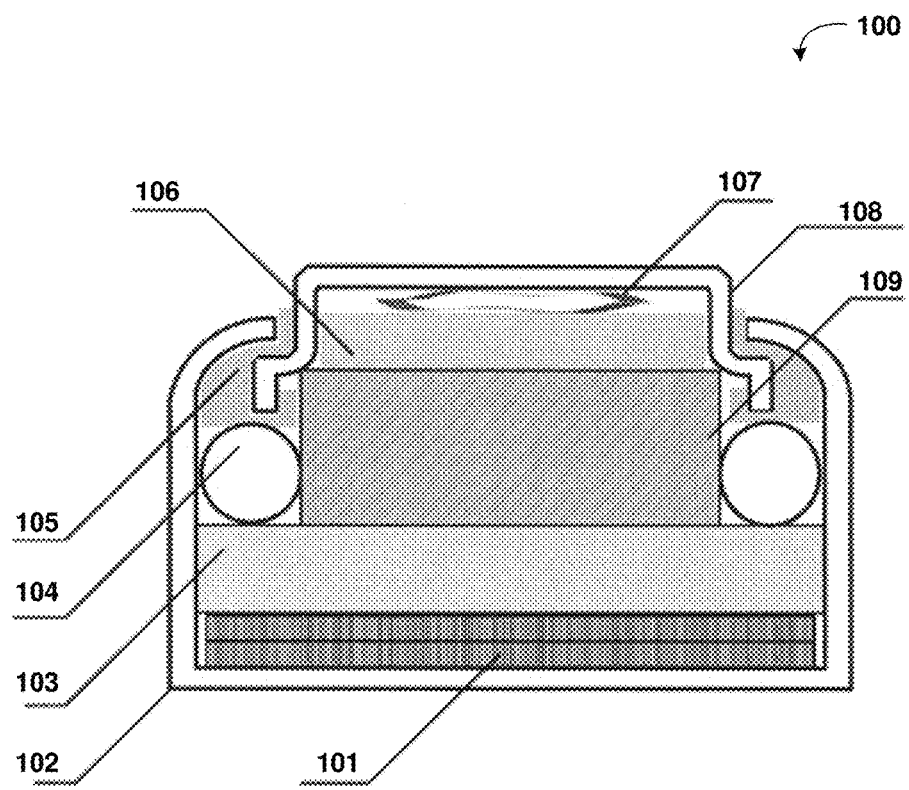
FIG. 1 illustrates a cross-sectional view of a lithium ion rechargeable battery according to one embodiment.

FIG. 1 illustrates an example lithium ion rechargeable battery 100 according to one embodiment. A lithium ion rechargeable battery 100 may be enclosed in a rigid, air-tight sealed metal can comprising an anode can 102 to seal the anode 101 and a cathode can 108 to seal the cathode 109 respectively from environmental conditions. The anode can 102 and the cathode can 108 may further reduce practical energy density, especially in large, multi-cell packs. In further embodiments, an isolation ring 105 is placed in between the anode 101 and the cathode 109 to ensure electrical isolation between the anode 101 and the cathode 109. Additionally, the isolation ring may further allow the lithium ion rechargeable battery 100 to be completely sealed after the isolation ring 105 is fully compressed between the anode can 102 and the cathode can 108.

In some embodiments, the anode 101 may include a silicon substrate, such as silicon wafer, or any other material where lithium atoms may physically fill in the vacant spots within the anode material without chemically bonding. In the instance that the anode 101 is a silicon wafer, the silicon wafer may comprise a microporous scaffold structure made of a silicon crystal.

Figure 2:
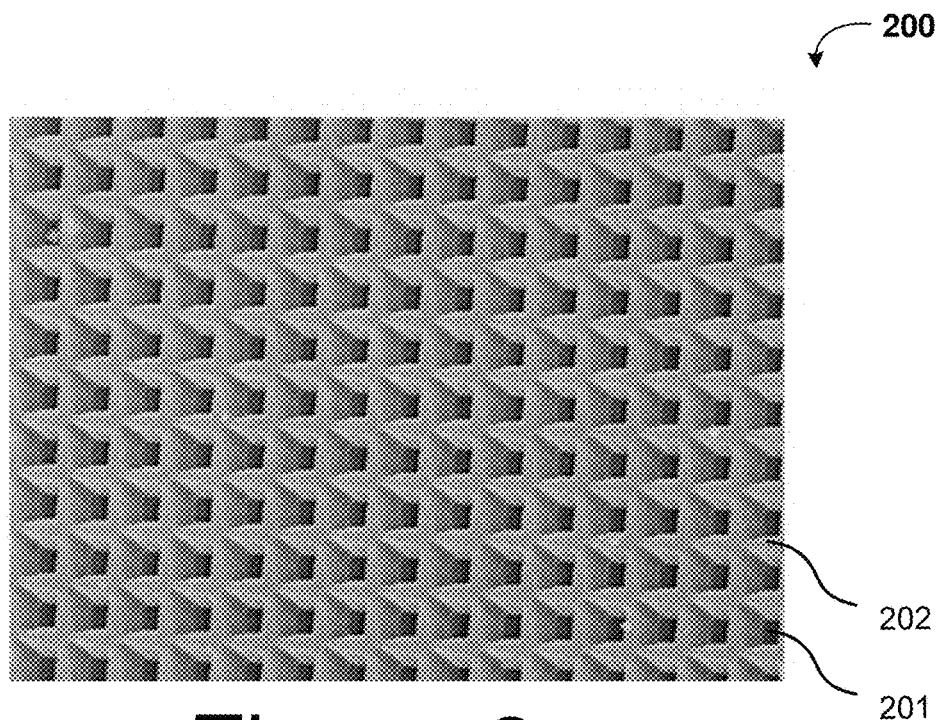
FIG. 2 illustrates a scanning electron microscope image of a silicon wafer of the anode according to one embodiment.

FIG. 2 illustrates a scanning electron microscope image of a silicon wafer 200 of the anode according to one embodiment. Aspects of FIG. 1 and FIG. 2 will now be described together. As depicted, the exemplary silicon wafer 200 of the anode 101 may include a microporous rectangular structure with periodic channels, where the periodic channels include hollow centers 201 surrounded by the channel walls 202. Additionally, in further embodiments, the hollow centers 201 have openings on both ends, so that the hollow centers are completely see through. In some embodiments, each periodic channel may be 5 μm by 5 μm, or even as small as 2 μm by 2 μm. However, it should be noted that these dimensions are not limited, but rather, may be any dimension in accordance to the size of the lithium ion rechargeable battery 100 and as would be appreciated by one of ordinary skill in the art upon studying the present disclosure. Additionally, the silicon wafer may also have a structure thickness of approximately 1 μm or less, and a height of approximately 100 μm. However, it should be noted that these structural specifications are by way of example only and can include a wide range of other dimensional proportions suitable for use within a lithium ion rechargeable battery 100.

Figure 3:
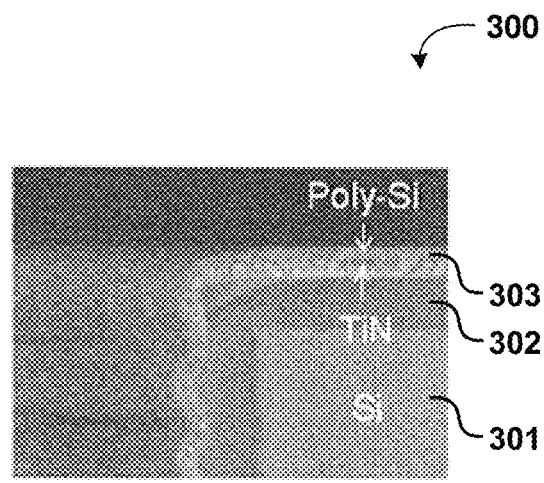
FIG. 3 illustrates a scanning electron microscope image of a channel wall of a silicon wafer of the anode according to one embodiment.

Additionally, the exemplary silicon wafer 200 of the anode 101 may be deposited with a protective layer over the microporous scaffold structure. FIG. 3 will be discussed here in conjunction with FIG. 1 and FIG. 2 to further clarify the various embodiments of the silicon wafer 200 of the anode 101. As illustrated, FIG. 3 depicts a scanning electron microscope image of a channel wall 300 of a silicon wafer 301. In some embodiments, the surface of the silicon wafer 301 may be covered with a protective layer 302 to prevent the lithium ions from penetrating into the microporous scaffold structure. The protective layer 302 may be deposited onto the microporous scaffold structure using any standard deposition techniques, such as Atomic Layer Deposition by way of example only. In some embodiments, the protective layer 302 may include noble metals, such as gold or platinum. In other examples, other materials used as the protective layer 302 may include titanium nitride, tantalum nitride, or any other material that has good electrical conductivity to collect the current running through the lithium ion rechargeable battery 100.

Additionally, a polycrystalline silicon layer 303 may be deposited on top of the protective layer 302. The polycrystalline silicon layer 303 may serve as the anode 101 of the lithium ion rechargeable battery 100. The polycrystalline silicon layer 303 may be deposited over the protective layer 302 using standard deposition techniques, such as Chemical Vapor Deposition by Way of Example Only.

Referring back to FIG. 1, the lithium ion rechargeable battery 100 may also include a cathode 109. The cathode 109 may be a lithium metal oxide where the Li atoms chemically form a complex compound. By way of example only, the cathode may include $LiMn_{0.5}Ni_{1.5}O_4$, $LiCoO_2$, or $LiFePO_4$. However, it should be noted that the cathode 109 need not be limited to the exemplary materials disclosed here, and instead, may include any material that would be appreciated by one of ordinary skill in the art.

Additionally, in some embodiments, an intermediate copper electrode 106 may be used for collecting the cathode current and delivering it to the cathode can 108 via a wave spring 107. The wave spring 107 may be used to ensure consistent electrical contact amongst all the internal battery components in the lithium ion rechargeable battery 100. In further embodiments, a Teflon O-ring 104 may be placed in between the anode can 102 and the cathode can 108 so as to further insure the separation of the anode can 102 from the cathode can 108.

The lithium ion rechargeable battery 100 may also include a separator 103 comprising an electrolyte to prevent physical contact between the anode 101 and the cathode 109, while also providing a medium for the lithium ions to travel between the anode 101 and the cathode 109. By way of example only, the electrolyte may include lithium salts such as $LiPF_6$, $LiBF_4$, $LiFePO_4$ or $LiClO_4$ in an organic solvent, such as ether. The electrolyte may be in direct contact with the anode 101, so that the electrolyte can penetrate into the anode pores. Once the electrolyte is in contact with the anode 101, the lithium ion rechargeable battery 100 may begin to charge and discharge accordingly. During charging, the anode 101 gives up some of its lithium ions, where the lithium ions then move through the electrolyte from the cathode 109 and towards the anode 101, such that the lithium ions are then intercalated into the anode material. The physical insertion of the lithium ions into the vacancies within the anode results in a volume expansion of the microporous scaffold structures of the anode 101. As described in further detail below, the anode material should not only be physically stable, but also be tolerant to volume expansion during the intercalation of the lithium ions. A poorly selected anode material incapable of expanding sufficiently will result in an inefficient rechargeable battery. When discharging, the lithium ions migrate back across the electrolyte from the anode 101 to the cathode 109, where the lithium ions are then intercalated into the cathode material.

Figures 4A, 4B:
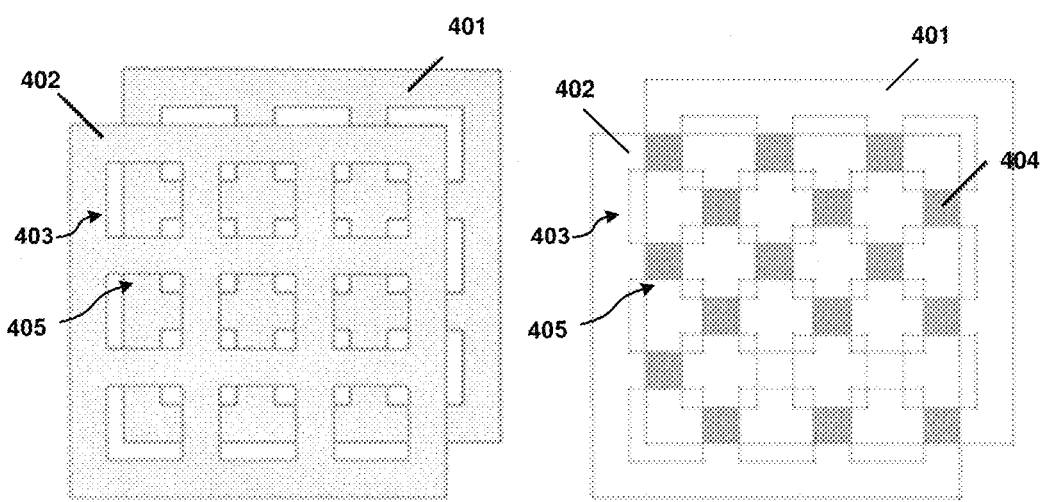
FIG. 4A illustrates a stacked anode structure with a plurality of channels according to one embodiment.
FIG. 4B illustrates the contact area of the stacked anode structure with a plurality of channels according to one embodiment.

FIGS. 4A and 4B illustrate layered or stacked anode structures 400A, 400B with a plurality of microporous scaffold structures 401, 402 according to various embodiments. As depicted, the anode may comprise microporous scaffold structure 400A, 400B stacked on top of one another. For optimum battery efficiency, the lithium ion rechargeable battery must be configured to experience low internal resistance. Here, internal resistance depends on the contact resistance between the stacked microporous structures 401, 402. For example, as illustrated in FIGS. 4A and 4B, the internal resistance is lessened when the top and bottom structures 401, 402 are aligned so that the top structure 401 is laterally shifted with respect to the bottom structure 402. The ideal lateral shift is when the channel walls 403 of the top structure 401 is stacked to coincide with channel walls 405 of the bottom structure, and vice versa, as illustrated. With such a shift alignment, there is an increase in the contact area of the stacked microporous scaffold structures, as further depicted with the dark shading illustrated FIG. 4B. The increase in the contact area results in a greater charge capacity, and more efficient charge flow between the anode and the cathode as a result of the decrease in contact resistance between the stacked anode structures 400A, 400B. However, this sort of ideal alignment is often difficult to achieve, especially when dealing with small lithium ion rechargeable batteries to be placed in small portable electronic devices, such as hearing aid devices.

Figures 5A, 5B:
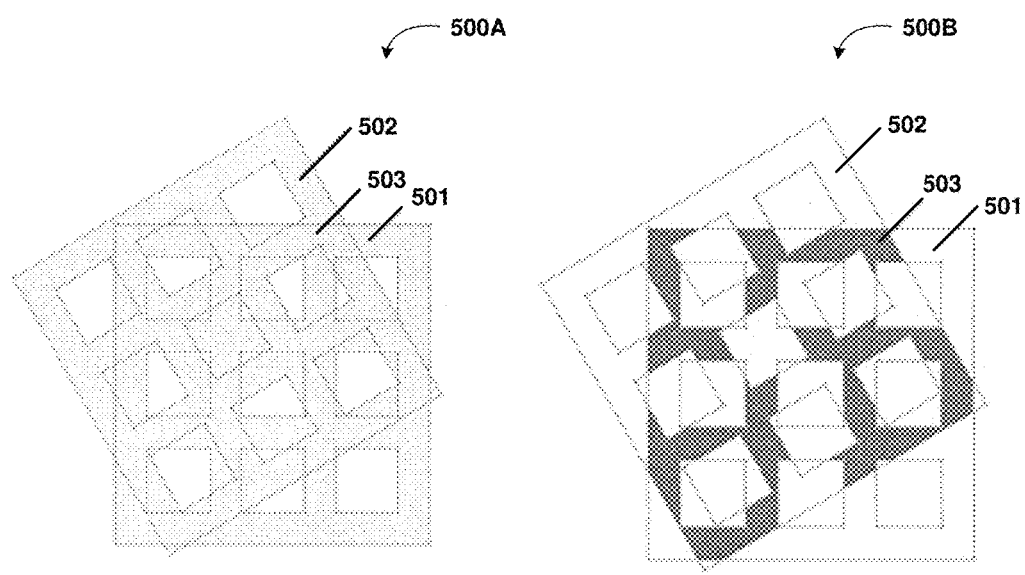
FIG. 5A illustrates a stacked anode structure with a plurality of channels rotated at an angle of sixty degrees according to one embodiment.
FIG. 5B illustrates the contact area of the stacked anode structure with a plurality of channels rotated at an angle of sixty degrees according to one embodiment.

FIGS. 5A and 5B illustrate layered anode structures 500A, 500B that are rotated at a specified angle rather than being laterally shifted, as depicted in FIGS. 4A and 4B. By rotating the top structure 502 with respect to the bottom structure 501, or vice versa, this may provide a way for further decreasing internal resistance between the stacked anode structures 500A, 500B. As such, the top structure 502 may be rotated at an angle of 60° with respect to the bottom structure 501. By doing so, this may provide a greater contact area 503 between the top and bottom structures 501, 502, as further highlighted in FIG. 5B with the dark shading. Additionally, rotating the top or bottom structures 501, 502 rather than shifting laterally, provides a much greater contact area 503 between the stacked anode structures 500A, 500B, especially when comparing the contact area 503 with FIG. 4B. This increased contact area in FIGS. 5A and 5B further reduces the contact resistance between the stacked anode structures 500A, 500B, thus providing a greater charge capacity and a greater efficient charge flow for the lithium ion rechargeable battery.

However, the rotation of the top structure 501 in relation to the bottom structure 502 need not be limited to a 60° rotation. Indeed, a rotation at any angle may provide some increase in the contact area, which decreases some internal resistance and increases overall battery efficiency. As such, the angle of the top structure 501 in relation to the bottom structure 502 may be rotated at any angle of 360°/n, where n is greater than 4.

Figure 6:
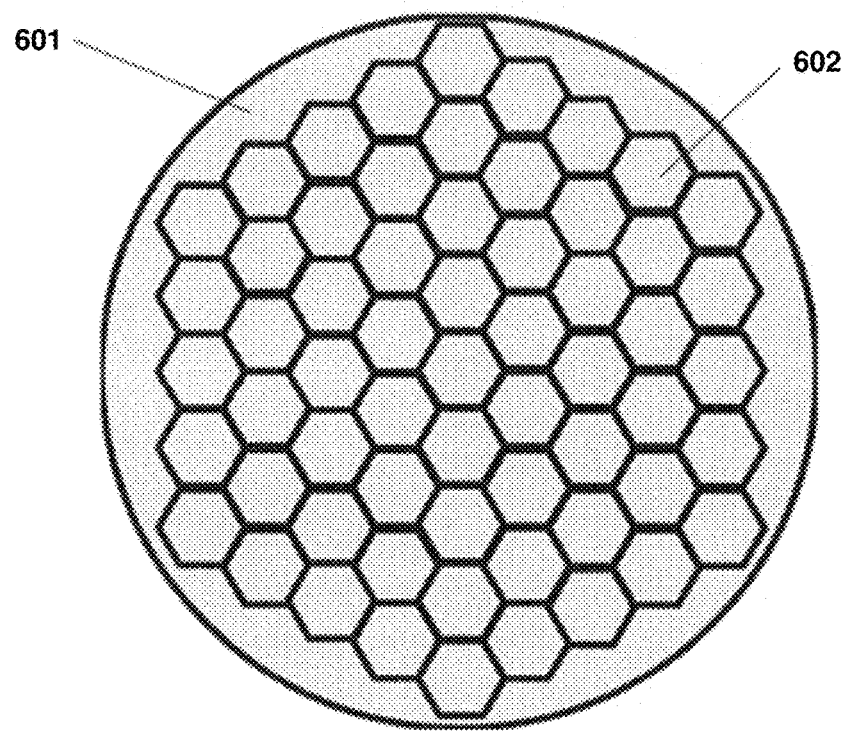
FIG. 6 illustrates a silicon wafer sheet with wafer chips in the shape of a hexagon according to one embodiment.

Additionally, in some embodiments, the microporous scaffold structure may include individual wafer chips cut from a large silicon wafer in the shape of an equilateral polygon. FIG. 6 illustrates a silicon wafer 601 with silicon chips 602 in the shape of a hexagon according to one embodiment. An anode with a silicon chip 602 in the shape of an equilateral polygon may allow the anode to be installed into circular shaped cans more easily, which may further reduce the manufacturing costs of the lithium ion rechargeable battery, making the disclosed lithium ion rechargeable battery more affordable and attractive to potential users.

Additionally, selecting a hexagon shape for the silicon chip 602 allows the silicon chips 602 to cover almost the entire space of silicon wafer 602 sheet without the presence of any gaps or spaces in between the wafer chips 602. The individual wafer chips 602 may then be each cut out from the silicon wafer 601 sheet using conventional laser scribing technology. Because most of the silicon wafer 601 sheet can be utilized without waste when forming the silicon chips 602 with a hexagon shape, there is a significant cost reduction in the overall manufacturing cost of the lithium ion rechargeable battery.

Additionally, in some embodiments, the wafer chips 602 cut from the silicon wafer 601 sheet may have no solid border. The absence of the solid border may be beneficial in reducing the stress of the microporous scaffold structure of the anode. For example, the absence of the solid border may allow the wafer chip 602 to freely expand in the lateral dimensions during the charge and discharge cycles of the lithium ion rechargeable battery. A poorly selected anode material that is not tolerant of volume expansion from the intercalation of the lithium ions will experience premature battery failure. Furthermore, the absence of the solid border in the wafer chips 602 allows for the corresponding volume changes during intercalation of the lithium ions without any shape variation in the perpendicular direction, which can otherwise result in significant increase in contract resistance and inefficient charge flow between the anode and the cathode.

While various embodiments of the disclosed technology have been described above, it should be understood that they have been presented by way of example only, and not of limitation. Likewise, the various diagrams may depict an example architectural or other configuration for the disclosed technology, which is done to aid in understanding the features and functionality that can be included in the disclosed technology. The disclosed technology is not restricted to the illustrated example architectures or configurations, but the desired features can be implemented using a variety of alternative architectures and configurations. Indeed, it will be apparent to one of skill in the art how alternative functional, logical or physical partitioning and configurations can be implemented to implement the desired features of the technology disclosed herein. Also, a multitude of different constituent module names other than those depicted herein can be applied to the various partitions. Additionally, with regard to flow diagrams, operational descriptions and method claims, the order in which the steps are presented herein shall not mandate that various embodiments be implemented to perform the recited functionality in the same order unless the context dictates otherwise.

Although the disclosed technology is described above in terms of various exemplary embodiments and implementations, it should be understood that the various features, aspects and functionality described in one or more of the individual embodiments are not limited in their applicability to the particular embodiment with which they are described, but instead can be applied, alone or in various combinations, to one or more of the other embodiments of the disclosed technology, whether or not such embodiments are described and whether or not such features are presented as being a part of a described embodiment. Thus, the breadth and scope of the technology disclosed herein should not be limited by any of the above-described exemplary embodiments.

Terms and phrases used in this document, and variations thereof, unless otherwise expressly stated, should be construed as open ended as opposed to limiting. As examples of the foregoing: the term "including" should be read as meaning "including, without limitation" or the like; the term "example" is used to provide exemplary instances of the item in discussion, not an exhaustive or limiting list thereof; the terms "a" or "an" should be read as meaning "at least one," "one or more" or the like; and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that may be available or known now or at any time in the future. Likewise, where this document refers to technologies that would be apparent or known to one of ordinary skill in the art, such technologies encompass those apparent or known to the skilled artisan now or at any time in the future.

The presence of broadening words and phrases such as "one or more," "at least," "but not limited to" or other like phrases in some instances shall not be read to mean that the narrower case is intended or required in instances where such broadening phrases may be absent. The use of the term "module" does not imply that the components or functionality described or claimed as part of the module are all configured in a common package. Indeed, any or all of the various components of a module, whether control logic or other components, can be combined in a single package or separately maintained and can further be distributed in multiple groupings or packages or across multiple locations.

Additionally, the various embodiments set forth herein are described in terms of exemplary block diagrams, flow charts and other illustrations. As will become apparent to one of ordinary skill in the art after reading this document, the illustrated embodiments and their various alternatives can be implemented without confinement to the illustrated examples. For example, block diagrams and their accompanying description should not be construed as mandating a particular architecture or configuration.

What is claimed is:

1. A rechargeable battery comprising:
an anode;
a cathode; and
a separator comprising an electrolyte to prevent physical contact between the anode and the cathode while also providing a medium for transporting ions;
wherein the anode comprises:
a microporous scaffold structure comprising a silicon crystal covered in a polycrystalline silicon layer; and
a protective layer deposited over the microporous scaffold structure to prevent a lithium ion from penetrating into the microporous scaffold structure, wherein the thin polycrystalline silicon layer is deposited over the protective layer.

2. The rechargeable battery of claim 1, wherein the protective layer comprises a noble metal to collect a current.

3. The rechargeable battery of claim 2, wherein the protective layer comprises a material made of platinum or gold.

4. The rechargeable battery of claim 1, wherein the protective layer comprises a material made of titanium nitride or tantalum nitride.

5. The rechargeable battery of claim 1, wherein the anode further comprises at least two or more microporous scaffold structures that are stacked on top of one another, such that there is an increase in contact area between the two or more microporous scaffold structures to reduce contact resistance of the rechargeable battery.

6. The rechargeable battery of claim 5, wherein the two or more microporous scaffold structures are stacked, such that a bottom layer with respect to a top layer is angled at 30°-60°.

7. The rechargeable battery of claim 1, wherein the microporous scaffold structure comprises periodic channels, such that each periodic channel comprises a surrounding wall and a hollow center.

8. The rechargeable battery of claim 1, wherein the microporous scaffold structure comprises individual wafer chips in a shape of an equilateral polygon cut from a silicon wafer.

9. The rechargeable battery of claim 8, wherein the shape of the equilateral polygon is a hexagon.

10. The rechargeable battery of claim 8, wherein the wafer chips comprise a material made of silicon crystal.

11. The rechargeable battery of claim 9, wherein the wafer chips of the microporous scaffold structure have no solid border along a perimeter of the wafer chips, thus allowing the wafer chips to expand laterally during a charge and a discharge cycle of the rechargeable battery.

12. A method for producing a rechargeable battery comprising:
providing a battery comprising:
an anode comprising a microporous scaffold structure made of silicon crystal with a polycrystalline silicon layer;
a cathode;
a permeable barrier comprising an electrolyte in between the anode and the cathode;
forming hollow periodic channels in the microporous scaffold structure of the anode; and
depositing the microporous scaffold structure of the anode with a protective layer comprising platinum, gold, or titanium nitride to prevent a lithium ion from penetrating into the microporous scaffold structure.

13. The method of claim 12, further comprising stacking at least a top microporous scaffold structure over a bottom microporous structure to create a stacked anode structure.

14. The method of claim 13, further comprising rotating the top microporous structure with respect to the bottom microporous structure, so as to provide increased contact area between the stacked anode structures.

15. The method of claim 14, wherein rotating the top microporous structure with respect to the bottom microporous structure ranges from a 30°-60° shift.

16. The method of claim 13, wherein the stacked anode structures are shifted laterally with respect to the top microporous structure and the bottom microporous structure.

17. The method of claim 12, wherein the microporous scaffold structure comprises individual silicon chips cut in a shape of a hexagon from a silicon wafer.

18. The method of claim 17, wherein the silicon chips of the microporous scaffold structure have no solid boundary at an outermost perimeter, thus allowing the microporous scaffold structure to expand laterally with an intercalation of a lithium ion during a charge and a discharge cycle of the rechargeable battery.

\* \* \* \* \*